(12) United States Patent
Atzmon et al.

(10) Patent No.: US 9,386,056 B1
(45) Date of Patent: Jul. 5, 2016

(54) SYSTEM, METHOD AND COMPUTER READABLE MEDIUM FOR PROVIDING MEDIA STREAM FRAGMENTS

(75) Inventors: Asaf Atzmon, Tel Aviv (IL); Ran Oz, Modi'in (IL)

(73) Assignee: ARRIS Enterprises, Inc., Suwanee, GA (US)

(*) Notice: Subject to any disclaimer, the term of this patent is extended or adjusted under 35 U.S.C. 154(b) by 531 days.

(21) Appl. No.: 11/936,835

(22) Filed: Nov. 8, 2007

Related U.S. Application Data

(60) Provisional application No. 60/916,832, filed on May 9, 2007, provisional application No. 60/916,817, filed on May 9, 2007, provisional application No. 60/865,700, filed on Nov. 14, 2006, provisional application No. 60/916,820, filed on May 9, 2007.

(51) Int. Cl.
*G06F 15/16* (2006.01)
*H04L 29/06* (2006.01)

(52) U.S. Cl.
CPC ..................... *H04L 65/60* (2013.01)

(58) Field of Classification Search
CPC ............... H04L 29/06027; H04L 29/06462; H04L 65/60
USPC ........................................................ 709/231
See application file for complete search history.

(56) References Cited

U.S. PATENT DOCUMENTS

| 6,865,609 | B1 | 3/2005 | Gubbi et al. | |
|---|---|---|---|---|
| 7,613,770 | B2 * | 11/2009 | Li ................................. | 709/203 |
| 2002/0163933 | A1 | 11/2002 | Benveniste | |
| 2002/0186662 | A1 * | 12/2002 | Tomassetti et al. ........... | 370/254 |
| 2002/0198929 | A1 | 12/2002 | Jones et al. | |
| 2003/0167425 | A1 * | 9/2003 | Bader et al. .................... | 714/100 |
| 2003/0204613 | A1 * | 10/2003 | Hudson et al. ................. | 709/231 |

(Continued)

FOREIGN PATENT DOCUMENTS

| EP | 1381237 A3 | 5/2004 |
|---|---|---|
| WO | 03/001296 A2 | 1/2003 |

(Continued)

OTHER PUBLICATIONS

Zheng, et al., "Distributed Prefetching Scheme for Random Seek Support in Peer-to-Peer Streaming Applications", Proceedings of the ACM Workshop on Advances in peer-to-peer multimedia streaming, ACM, Nov. 11, 2005, pp. 29-38.

(Continued)

*Primary Examiner* — June Sison
*Assistant Examiner* — Steven Nguyen
(74) *Attorney, Agent, or Firm* — Lori Anne D. Swanson (57) ABSTRACT

A method for providing on demand streaming media to a user device, the method includes: receiving, at a streaming device, a request to stream a certain media stream to a user device; wherein the streaming device is coupled to multiple user devices over a network and is adapted to concurrently transmit multiple media streams to the multiple user devices; obtaining media stream fragments that belong to the certain media stream by the streaming device and from multiple distribution devices; wherein the streaming device and the multiple distribution devices form a high bandwidth media distribution peer to peer network; wherein the streaming device is prevented from uploading media stream fragments to any distribution device; and streaming to the user device the certain media stream.

29 Claims, 7 Drawing Sheets

(56) References Cited

U.S. PATENT DOCUMENTS

| | | |
|---|---|---|
| 2003/0221009 A1 | 11/2003 | Standridge et al. |
| 2004/0015995 A1 | 1/2004 | Shao et al. |
| 2004/0073693 A1* | 4/2004 | Slater et al. .................. 709/231 |
| 2005/0125405 A1* | 6/2005 | Watson et al. .................. 707/7 |
| 2005/0203851 A1* | 9/2005 | King et al. .................... 705/51 |
| 2005/0251577 A1 | 11/2005 | Guo et al. |
| 2005/0267948 A1* | 12/2005 | McKinley et al. ............ 709/217 |
| 2006/0080454 A1* | 4/2006 | Li ................................ 709/231 |
| 2006/0109870 A1* | 5/2006 | Miyaji et al. ................. 370/537 |
| 2006/0171308 A1 | 8/2006 | Jung |
| 2006/0190615 A1 | 8/2006 | Panwar et al. |
| 2007/0192474 A1 | 8/2007 | Decasper et al. |
| 2008/0016201 A1* | 1/2008 | Thompson .................... 709/223 |
| 2008/0098123 A1* | 4/2008 | Huang et al. .................. 709/231 |
| 2008/0112315 A1 | 5/2008 | Hu et al. |
| 2009/0055547 A1* | 2/2009 | Hudson et al. ............... 709/231 |

FOREIGN PATENT DOCUMENTS

| | | |
|---|---|---|
| WO | 2006012610 A1 | 2/2006 |
| WO | 2007/021725 A2 | 2/2007 |

OTHER PUBLICATIONS

Kikuchi, et al., "RFC 3016: RTP Payload Format for MPEG-4 Audio/Visual Streams", RFC Standards, Nov. 2000.

* cited by examiner

SYSTEM, METHOD AND COMPUTER READABLE MEDIUM FOR PROVIDING MEDIA STREAM FRAGMENTS

RELATED APPLICATION

This application claims the priority of U.S. provisional patent application Ser. No. 60/916,832 filing date May 9 2007, U.S. provisional patent application Ser. No. 60/916,820 filing date May 9 2007, U.S. provisional patent application Ser. No. 60/916,817 filing date May 9 2007, and U.S. provisional patent application Ser. No. 60/865,700 filing date Nov. 19 2006.

FIELD OF THE INVENTION

The invention relates to methods, systems and computer readable medium for providing media stream fragments.

BACKGROUND OF THE INVENTION

Current Video On Demand (VOD) solutions suffer from inefficient coupling of storage and streaming capacity which results in high operational costs. Albeit some emerging remote storage architectures, the bulk of any VOD network relies on devices streaming through Direct Attached Storage (DAS) in order to achieve good I/O performance of HDD media. Using standard techniques, it is therefore desirable to foresee what content will be requested at any given location, which drives different distribution and caching algorithms.

Most VOD systems opt to place faster devices with high-throughput closer in the network to where the demand is; since it is impractical to place all the content at that devices, only the expected popular content is distributed to these devices; in case of a "miss", content needs to be streamed from an upstream location, which means higher latency and more network traffic.

As storage costs are constantly on decline it is becoming a common practice to employ masses of storage capacity on distributed devices and to introduce a large amount of content duplication. Since each streaming device becomes a centralized server for its serving population it needs to become very scalable and to reach high I/O throughput. This creates a race between the VOD servers for who can stream more out of an "off the shelf" server which in essence commoditized their business. In addition, user demand for more content hours is growing in an overwhelming rate. The approach of "duplicate all everywhere" can not scale to the future world of Long-Tail Content, dealing with tens to hundreds of content hours.

A commonly used file sharing mechanism is known as BitTorrent. It defines the protocols and algorithms by which a file can be shared by the protocol participants which are referred to as peers. BitTorrent capitalizes on the bandwidth of peers by forcing them to upload pieces of content to other peers while they download other pieces of that content. The session of transfer of a single content among a set of peers is referred to as torrent, and the complete set of peers sharing a torrent is called a swarm. Peers which have the complete content stored at their computer and therefore only upload content are referred to as seeds, while peers which have only parts of the content are called leaches. A torrent is alive as long as there is at least one seed in the torrent.

Files transferred using BitTorrent are split to fixed sized pieces which are typically of size 256 KB. Each piece is split into fixed sized blocks which are typically of size 16 KB. Blocks are the transmission units of the network, but the protocol only accounts for transferred pieces.

A user joins an existing torrent by downloading a .torrent file usually from a Web server. The .torrent file contains metadata of the file to be downloaded, e.g. the number of pieces and a hash value of each piece. It also includes the IP address of the so-called tracker of the torrent. The tracker is the only centralized component of BitTorrent, but it is not involved in the actual distribution of the file. It only keeps track of peers currently involved in the torrent and collects statistics of it. Recently an alternative tracker-less method has been included as part of BitTorrent. This method uses a "distributed sloppy hash table" (DHT) that stores and exchanges peer's information at the peers themselves.

When joining a torrent, a new peer asks from the tracker a list of IP addresses of peers to connect to. Typically, the initial list includes about 50 peers that are randomly selected by the tracker. These peers will form the initial peer set of the new peer. The initial peer set can be dynamically modified. The modification is responsive to peers that connect directly to the new peers or by peers leaving the torrent. Each peer reports its state to tracker every 30 minutes or when disconnecting from the torrent. The state includes the amount of bytes uploaded and downloaded from the beginning of joining the torrent. The peer will also connect the tracker to receive a set of new peers when its set falls below some given threshold.

Every peer exchange message and file blocks with other peers in its peer set via a wired protocol which is based on TCP/IP. A peer uses these information messages to identify what pieces exist at which peers. This information allows him to request missing pieces from its peer set. Every peer maintains two Boolean states with any other peer it has connection to, namely interested/uninterested and choke/unchoke. When peer S is interested in pieces from peer D it send an interested message to it. In turn, peer D can either decide to include peer S as one of its downloaders in which case we will say that it unchokes peer S, or it may decide to choke peer D, resulting in no blocks uploaded to it for the unchoke period.

Two core algorithms govern the behavior of peers with each-others: Choke Algorithm and Rarest First. The choke algorithm defines at each round for each peer what other peers will be unchoked. A round is typically up to every 10 seconds. In general, peers are unchoked on a tit-for-tat basis that is the peers that upload the most blocks to that serving peer will be reciprocated. Another mechanism called optimistic unchoking randomly unchokes "weaker" peers to allow new peers who don't have yet sufficient blocks to account for a reasonable upload rate to "play in the game".

The rarest first algorithm defines for each peer what pieces to request in what order. In general, the peer will first ask for the piece with the smallest number of holders, thus contributing to a good dissemination of the content pieces between the entire peers population.

BitTorrent is quite effective for file transfer but it is not adequate for the sake of streaming since pieces of content are not being downloaded sequentially. Recently, a large number of web companies began to offer streaming "TV-like" services which are based on BitTorrent with some adaptation. This type of service is informally referred to as P2PTV.

P2PTV works by dividing the content stream into segments each one composed of a sequential number of pieces. On every given time frame, one segment is the active segment. When a new peer is joining a channel it begins to participate in a torrent session of the active segment. In fact, different peers view the channel in some time variation, each one views at a given time a certain piece of the active segment. Rather than storing pieces on the hard-drive, like with the traditional protocol, P2PTV uploads blocks directly from the memory buffers.

There is a need to provide an efficient method, system and computer readable medium for providing visual content to a user.

SUMMARY OF THE INVENTION

A method for providing on demand streaming media to a user device, the method includes: receiving, at a streaming device, a request to stream a certain media stream to a user device; wherein the streaming device is connected to multiple user devices over a network and is adapted to concurrently transmit multiple media streams to the multiple user devices; obtaining media stream fragments that belong to the certain media stream by the streaming device and from multiple distribution devices; wherein the streaming device and the multiple distribution devices form a high bandwidth media distribution peer to peer network; wherein the streaming device is prevented from uploading media stream fragments to any distribution device; and streaming to the user device the certain media stream.

A computer readable medium having computer-readable code embodied therein for providing on demand streaming media to a user device, the computer-readable code includes instructions for: receiving, at a streaming device, a request to stream a certain media stream to a user device; wherein the streaming device is connected to multiple user devices over a network and is adapted to concurrently transmit multiple media streams to the multiple user devices; obtaining media stream fragments that belong to the certain media stream by the streaming device and from multiple distribution devices; wherein the streaming device and the multiple distribution devices form a high bandwidth media distribution peer to peer network; wherein the streaming device is prevented from uploading media stream fragments to any distribution device; and streaming to the user device the certain media stream.

A streaming device, the streaming device includes: a receiver, adapted to receive a request to stream a certain media stream to a user device and to receive media stream fragments of the certain media stream; wherein the media stream fragments are obtained from multiple distribution devices; wherein the streaming device and the multiple distribution devices form a high bandwidth media distribution peer to peer network; wherein the streaming device is connected to multiple user devices over a network; multiple buffers, wherein a certain buffer is adapted to buffer media stream fragments of the certain media stream; and a transmitter, coupled to the multiple buffers, wherein the transmitter is adapted to concurrently transmit multiple media streams to the multiple user devices; wherein the multiple media stream comprises the certain media stream.

BRIEF DESCRIPTION OF THE DRAWINGS

The abovementioned and other objects, features, and advantages of the present invention will become more apparent from the following detailed description, when applied in conjunction with the accompanying drawings. In the drawings, similar reference characters denote similar elements throughout the different views, in which.

DETAILED DESCRIPTION OF THE DRAWINGS

For simplicity of explanation the following description uses BitTorrent terminology and refers to elements of the BitTorrent mechanism. It is noted that other file sharing mechanisms can be utilized without departing from the scope of the invention.

A "media content representation" can be compressed, uncompressed, decoded, encoded or in any other format readable by a processor. The media content (that is represented by the media content representation) can include audio information, visual information, textual information or a combination thereof. It can be, for example, a musical work, a movie, a video clip, an advertisement and the like.

Many distribution devices and one or more streaming devices can form one or more high bandwidth media distribution peer to peer network. Conveniently, each streaming device and multiple distribution devices associated with it form a single cluster that can also be referred to as a single high bandwidth media distribution peer to peer network. The distribution devices in the cluster are assumed to be in close proximity to the streaming device and to each other. The clusters can also communicate with each other.

The high bandwidth media distribution peer to peer network does not include user devices such as set top boxes, mobile devices, PDAs or user computers.

A streaming device conveniently provides a self-contained VOD function to all the user devices it manages, and it is sized accordingly in its streaming capacity to handle sessions up to some given concurrent rate at the pick usage. It is noted that the streaming device can include multiple processors, include multiple components but this is not necessarily so. For example, it can include a single CPU, can be a fully-equipped blade server acting as one logical streaming device, and the like. The streaming device is the sole component that serves content to user devices. A distribution device does not directly interact with a user device. The distribution device is intended to store relatively few media stream fragments per media stream and optionally cache media stream fragments from other media streams. It is capable of acquiring the content in a real-time manner using peer to peer techniques from distribution devices that can be deployed at the core of the network.

Each distribution device is a resource of some storage and throughput capacity. The distribution device can be similar to each other (have similar storage space, similar bandwidth, similar computational resources) though this is not necessary. A switched network allows routing of packets between all the distribution devices in various configurations including a full-mesh configuration and from the distribution devices to the streaming devices. The streaming devices only receive content but they are never the source of content for a distribution device. They download content to end users.

Each high bandwidth media distribution peer to peer network can also include a tracker device or be connected to such a tracker device. It is noted that a single tracker can serve multiple high bandwidth media distribution peer to peer networks.

A typical streaming procedure includes:

a. A user browses through the catalog to find a movie (or other media content) he is interested in, he completes the needed transactions and issues a user request to receive a media stream. This request can be, for example, a RTSP SETUP command to a RTSP server which resides at its streaming device. The movie can be represented by a media content representation that is conveniently partitioned to media stream portions. Each media stream portion can include one or more groups of media stream fragments.

b. Based on the assetURL parameter within the RTSP SETUP command, the streaming device access a .torrent file and uses it to connect to a tracker and receive a list of peers (distribution devices) that are involved in that torrent swamp.

c. The streaming device obtains media stream fragments from multiple distribution devices and starts serving the movie from a buffer it maintains. This involves obtaining media stream fragments from the distribution devices, storing the media stream fragments in a buffer of the streaming device and then streaming the media stream fragments to the user. The media stream fragments are obtained by establishing peer to peer sessions with distribution devices that hold the media stream fragments.

d. Optionally, the distribution devices obtain media stream fragments that are associated with (for example—that belong to the same media content representation) the media stream fragments requested by the streaming device.

The streaming device includes multiple buffers and each buffer can be allocated for multiple media stream fragments that belong to the same media stream. In order to ensure consistent streaming of media stream fragments to a user device and to be able to manage network timing irregularities that buffer should maintain a certain amount of continuous media stream fragments (for example—media stream fragments that represent X seconds from the media content). When the buffer stores this amount of media stream fragments it reaches a steady state. Since the streaming device cannot foresee what content it will played next, once a content request (or content jump) is received, it will need to reach this steady state as fast as possible. Once in the steady state, it should be able to maintain it as long as the session continues (excluding jumps).

With respect to a given torrent, a distribution device could be either a seeder or a leach, according to whether it holds the entire content. Streaming devices are prevented from downloading media stream fragments to distribution devices and can be referred to as an "absolute" leach.

A transfer request is a request to obtain a media stream fragment from a distribution device that belongs to the high bandwidth media distribution peer to peer network. A swamp can include the streaming device and all distribution devices that belong to said high bandwidth media distribution peer to peer network. A torrent is defined by the aggregated distribution of media stream fragments that are a part of the content that a torrent file identifies. Conveniently, the content includes a media content representation portion (and not the whole media content representation). Conveniently, a media stream fragment includes a single group of pictures. Yet for another example, an amended media stream fragment can include one or more I frames.

Conveniently, the streaming device can generate high priority transfer requests and medium priority transfer requests. High priority transfer requests (also called urgent transfer requests) can be issued until a buffer reaches a steady state. Medium priority transfer requests will be generated while the buffer is in that steady state.

Conveniently, a distribution device can generate low priority "disseminating" transfer requests in order to disseminate media stream fragments to other peers of the high bandwidth media distribution peer to peer network. It is noted that the "dissemination" process can distribute media stream from one high bandwidth peer to peer network to another. This can be useful when new media stream fragments are ingested to the high bandwidth media distribution peer to peer network at a specific distribution device. These low priority "disseminating" transfer requests can trigger a background process to disseminate these new media stream fragments to the rest of the high bandwidth media distribution peer to peer network.

Conveniently, if the streaming device requests to obtain certain media stream fragments (for example—media stream fragments that describe a certain period of a media content) then other media stream fragments of the same media content (for example—media stream fragments that describe the next period of that media content) can be obtained by distribution devices of that high bandwidth media distribution peer to peer network. This can enhance to locality of media stream fragment fetching and thus improve the performance of the high bandwidth media distribution peer to peer network. Especially, this feature can reduce the latency associated with obtaining media stream fragments by the streaming device. In order to obtain such media stream fragments the distribution devices generate low priority "local" transfer requests.

A distribution device can apply a modified choke algorithm in order to determine which transfer requests (from its peers) to fulfill (unchoke) and which transfer requests to ignore (choke). The distribution device will determine which transfer request to fulfill based upon the priority of transfer request. Conveniently, high priority transfer requests are fulfilled.

According to an embodiment of the invention if the distribution device can still fulfill other requests then the distribution device will try to fulfill medium priority transfer requests and then low priority transfer requests. It is noted that a medium priority transfer limitation can be enforced. It is further noted that the distribution device can also enforce a "local" type low priority transfer request limitation and a low priority "disseminating" transfer request limitation.

For example, a distribution device can unchoke high priority transfer requests, and out of its remaining capacity allocate a certain percent (for example 50%) for fulfilling medium priority transfer requests, another percent (for example 30%) for fulfilling low priority "local" transfer requests and yet a further percent (for example 20%) for fulfilling low priority "disseminating" transfer requests. It is noted that these percentages reflect various quotes. One limitation can differ from another, but this is not necessarily so. If a streaming device receives transfer requests that exceed a relevant limitation it can select between the requests in various manners including but not limited to a random manner.

According to an embodiment of the invention when a certain buffer is not full enough the streaming device can send the same high priority transfer requests to multiple distribution devices. For example, it can send high priority transfer requests (to obtain media stream fragments required to fill the buffer) to all (or most) of the distribution devices included in its active peer set. Once the streaming device receives a media stream fragment it will cancel the transfer requests (relating to the obtained media stream fragment) to peers that did not provide that media stream fragment.

If, for example, the streaming device is expected to maintain X seconds of media content then the urgent mode can maintain until at least X seconds of that media content (and even more than X seconds) are obtained.

Conveniently, a tracker sends to the streaming device a list of active distribution devices. The list conveniently includes at least one distribution device that belongs to the high bandwidth media distribution peer to peer network that includes the streaming device.

The selection of which media stream fragment to request can be implemented in various manners, including but not limited to the rarest first algorithm. The rarest first algorithm is known in the art and it tries to ensure a good dissemination of media stream fragments. It is noted that the rarest first algorithm is usually applied for low priority transfer requests and not for high priority transfer requests and medium priority transfer requests.

Conveniently, when new media stream fragments enter one or more high bandwidth media distribution peer to peer networks it is ingested into one of the distribution devices and then is disseminated though these one or more high bandwidth media distribution peer to peer networks.

Conveniently, a media stream fragment can be associated with metadata (such as but not limited to popularity metadata reflecting requests of the media content representation by various user devices) that will govern the "magnitude of dissemination" of that media stream fragment and affect the behavior of the dissemination.

In general, the media stream fragment can be sent to a certain distribution device (that can be selected in various manners including random selection) within each high bandwidth media distribution peer to peer network.

By generating and accepting low priority "disseminating" transfer requests this media stream fragment can be disseminating throughout the high bandwidth media distribution peer to peer network.

Conveniently, these low priority "disseminating" transfer requests can be generated by a distribution device until the media streams fragments are spread in an acceptable manner. This can be evaluated by monitoring the amount of media stream fragments that are stored in a distribution device. Once the amount reaches a predefined threshold the disseminating can stop or at least be reduced.

It is noted that both streaming devices and distribution devices are equipped with limited storage units. These storage units are used to cache media stream fragments obtained by these devices.

Conveniently, a streaming device caches media stream fragments for multiple purposes: reducing "session setup" time by caching popular media content and reducing "trick-play seek time" by caching independently decodable frames (such as I frames) of a modified media stream that includes only I-frames.

In order to determine which media content is popular the streaming device can maintain a popularity ranking table for each torrent it serves. The ranks should be bound within a given time-frame is updated in a periodical manner. Once a given rank threshold is exceeded for a given torrent then the relevant media stream fragments will be cached. Conveniently, the caching can include caching the media stream fragment level by maintaining a counter for each media stream fragment passed through the system.

Typically, a relatively large amount of media stream fragments (for example media stream fragments that represent few minutes of a media content) are cached per a selected torrent. Conveniently, about fifteen minutes of each selected media content are cached.

According to another embodiment of the invention metadata such as Electronic Program Guide (EPG) information about a certain movie is not sent to the user unless it can be delivered to the user at predefined conditions. These conditions can include the size of that torrent swamp.

Conveniently, TCP/IP overhead can be reduced by utilizing the fact that a relatively small number of distribution devices form (with the streaming device) a high bandwidth media distribution peer to peer network. In addition, each peer of said high bandwidth media distribution peer to peer network maintains a large number of sessions. Accordingly, TCP/IP session handshake overhead and overall memory overhead can be reduced by using a predefined TCP/IP session pool. A pool of X sessions is pre-allocated per peer. When a session is required from peer S to peer D, peer S will check whether one of the slots is already bound to peer D. If such is the case then peer S will tunnel its request over that session. It is reasonable to assume that a given peer could handle all its peer connections concurrently.

In a typical BitTorrent implementation TCP/IP is used to control the transfer of information as well as for conveying the data. Conveniently, the TCP/IP channels are separated from UDP delivery channels. Accordingly, peers S and D will maintain one TCP/IP control channel and two UDP/IP delivery channels S→D and D→S.

Figure 1:
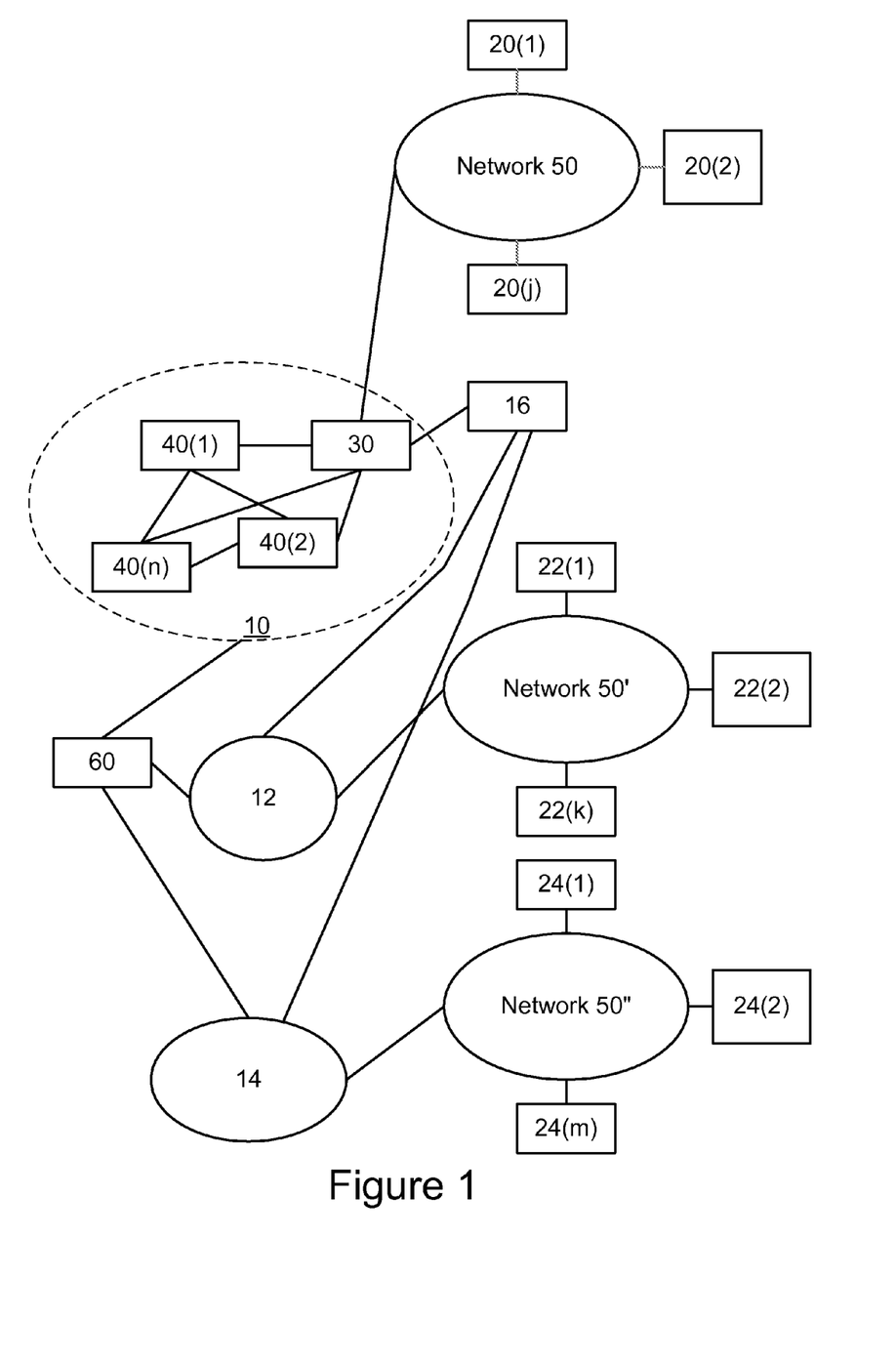
FIG. 1 illustrates multiple high bandwidth media distribution peer to peer networks and user devices according to an embodiment of the invention.

FIG. 1 illustrates multiple high bandwidth media distribution peer to peer networks 10, 12 and 14 and user devices 20(1)-20(j), 22(1)-22(k) and 24(1)-24(m) according to an embodiment of the invention.

Each a high bandwidth media distribution peer to peer network out of 10, 12 and 14 includes a streaming device (such as streaming device 30 of network 10) and multiple distribution devices (such as distribution devices 40(1)-40(n) of network 10).

Each high bandwidth media distribution peer to peer network out of 10, 12 and 14 can include a tracker or be connected to a tracker. FIG. 1 illustrates tracker 16 that is connected to high bandwidth media distribution peer to peer networks 10, 12 and 14. It is noted that trackers can be allocated per high bandwidth media distribution peer to peer networks and that in such a cases these trackers can communicate with each other but this is not necessarily so.

It is further noted that each high bandwidth media distribution peer to peer network can use other control means and for example, if a distributed sloppy hash able algorithm is applied then there is no tracker. Yet for another example, other file sharing mechanisms can be applied.

High bandwidth media distribution peer to peer networks 10, 12 and 14 can communicate with each other.

Streaming device 30 is connected to user devices 20(1)-20(j), over network 50 and is adapted to concurrently transmit multiple media streams to these multiple user devices.

Streaming device 30 is prevented from uploading media stream fragments to distribution devices 40(1) -40(n).

Each high bandwidth media distribution peer to peer network can operate in the manner specified above, thus, for example, high priority transfer requests, medium priority transfer requests and low priority transfer requests can be sent to peer members and responded by these peer members in order to provide enough media stream fragments to streaming device 30. Streaming device 30 streams consecutive media stream fragments to user devices. The process can be triggered by a user request to view a certain media content from a certain point of that media content, for a trick play request and the like. A more detailed description of a distribution device, of a streaming device and of various methods implemented of such devices is provided hereinafter.

For example, assume that a user (that uses user device 20(1)) requests to watch a movie from a first point in time. Streaming device 30 will generate high priority transfer requests to obtain a first group of media stream fragments from about that first point in time till a second point in time. The high priority transfer requests can be sent concurrently to multiple distribution devices (out of distribution devices 40(1)-40(n). These high priority transfer requests (fulfilled on a media stream fragment basis) are fulfilled by some of the distribution devices. Once the appropriate buffer of streaming device 30 reaches a steady state then streaming device 30 can generate medium priority transfer requests. These transfer requests can request to obtain a second group of media stream fragments.

In addition, a distribution device can initiate a low priority transfer requests in order to obtain a fourth group of media stream fragments. These low priority transfer requests can be low priority "dissimilation" and/or low priority "local" transfer requests. The low priority "dissimilation" transfer requests should spread new content across one or more high bandwidth peer to peer network in various manners such as uniform distribution or based on some popularity distribution function.

It is noted that streaming device 30 can serve multiple user devices concurrently and that multiple types of transfer requests can be exchanged over high bandwidth media distribution peer to peer network 10 at the same time.

Figure 2:
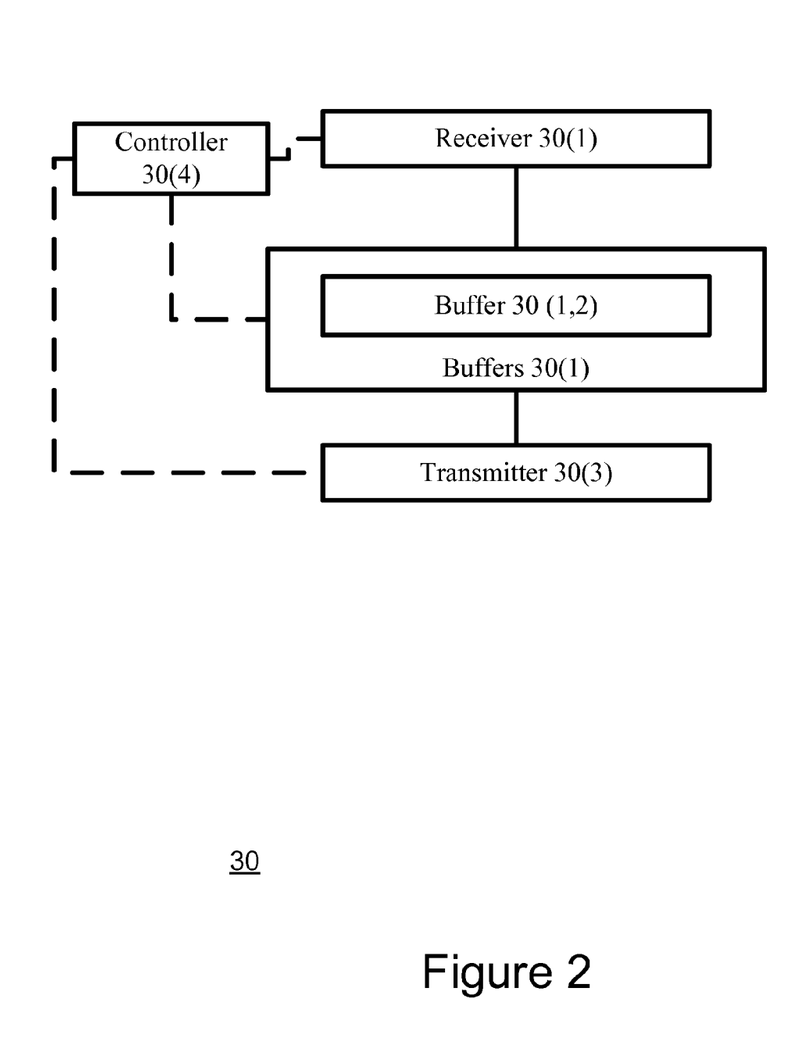
FIG. 2 illustrates a streaming device according to an embodiment of the invention.

FIG. 2 illustrates streaming device 30 according to an embodiment of the invention.

Streaming device 30 can be a server, but this is not necessarily so. Streaming device 30 includes receiver 30(1), transmitter 30(3), multiple buffers 30(2) and controller 30(4). Controller 30(4) controls the other components (30(1), 30(2) and 30(3)) of streaming device 30. It may communicate with a tracker such as tracker 16. It is noted the prior art processors, I/O interfaces, busses, bridges, memory units, software, firmware and/or middleware can be utilized to provide these mentioned above functionalities.

Transmitter 30(3) and receiver 30(1) participate in downloading media stream fragments from distribution devices (such as 40(1)-40(n)) and in streaming media stream fragments to user devices.

Receiver 30(1) is adapted to receive a request to stream a certain media stream to a user device and is adapted to receive media stream fragments of the certain media stream. It is noted that controller 30(4) can receive requests via other receiving components such as a control signal receiver. It can also receive media stream fragments of other media streams for various purposes including caching.

Multiple buffers 30(2) may include a certain buffer per each media stream although a plurality of buffers can be allocated (at a certain point in time) for the same media stream.

Transmitter 30(3) is connected to multiple buffers 30(2), and is adapted to concurrently transmit multiple media streams (including the certain requested media stream) to multiple user devices.

Streaming device 30 can participate in multiple peer to peer sessions and can concurrently serve multiple on demand requests from users.

Conveniently, controller 30(3) is adapted to send transfer requests to obtain the media stream fragments from the multiple distribution devices. Streaming device 30 can determine the priority of a transfer request in response to a state of a buffer (such as buffer 30(2, 1)) allocated for buffering the media stream fragments of a certain (requested) media stream.

Additionally or alternatively, streaming device can determine the priority of a transfer request in response to streaming discontinuities of the certain media stream. These streaming discontinuities can result from network problems as well as from user request to view a movie (or other media content) in a non-sequential manner. Thus, requests to jump to a new point of a movie can trigger high priority transfer requests.

In order to support trick play modes such as fast forward playback and fast backward a modified media stream is generated. The modified media stream includes independently decodable frames (such as I frames).

Once a fast forward request or a fast backward request is received the streaming devices will obtain (unless it previously cached the relevant media stream fragments) media stream fragments of that modified media stream, buffer them and stream them (according to their original order) to the user device. These independently decodable frames can be close in time to the point in time in which the trick play request was received.

The modified media stream can be generated in various manners and by various devices. For example, streaming device 30 can cache independently decodable frames extracted from media stream fragments that were obtained by the streaming device. The amount of cached media stream fragments can be limited thus a caching policy is enforced by streaming device 30.

According to another embodiment of the invention streaming device 30 caches media stream fragments obtained by the streaming device based upon a popularity of media streams to which the media stream fragments belong.

Yet according to another embodiment of the invention streaming device 30 caches independently decodable frames of a media stream that was requested by an end user.

According to an embodiment of the invention a media content representation is split to multiple media content representation portions. This partition is described in more details in relation to FIGS. 6 and 7. It can be responsive to at least one characteristic of the certain media stream.

Each media content representation portion can include a media stream fragment group. Multiple media stream fragment groups can form a media content representation or even a portion of a media content representation. Conveniently, instead of retrieving media stream fragment groups that belong to the whole media content representation system 10 can concentrate on media stream fragment groups that belong to a portion of the media content representation. The tracker will provide information related to peers that store only the relevant portion. Peer to peer transfer requests concentrate only on a relevant media content representation portion and are more efficient (provide lower latency, require less storage space, simplify the reconstruction of the media stream). Accordingly, streaming device 30 can determine which media stream fragment group to obtain.

Figure 3:
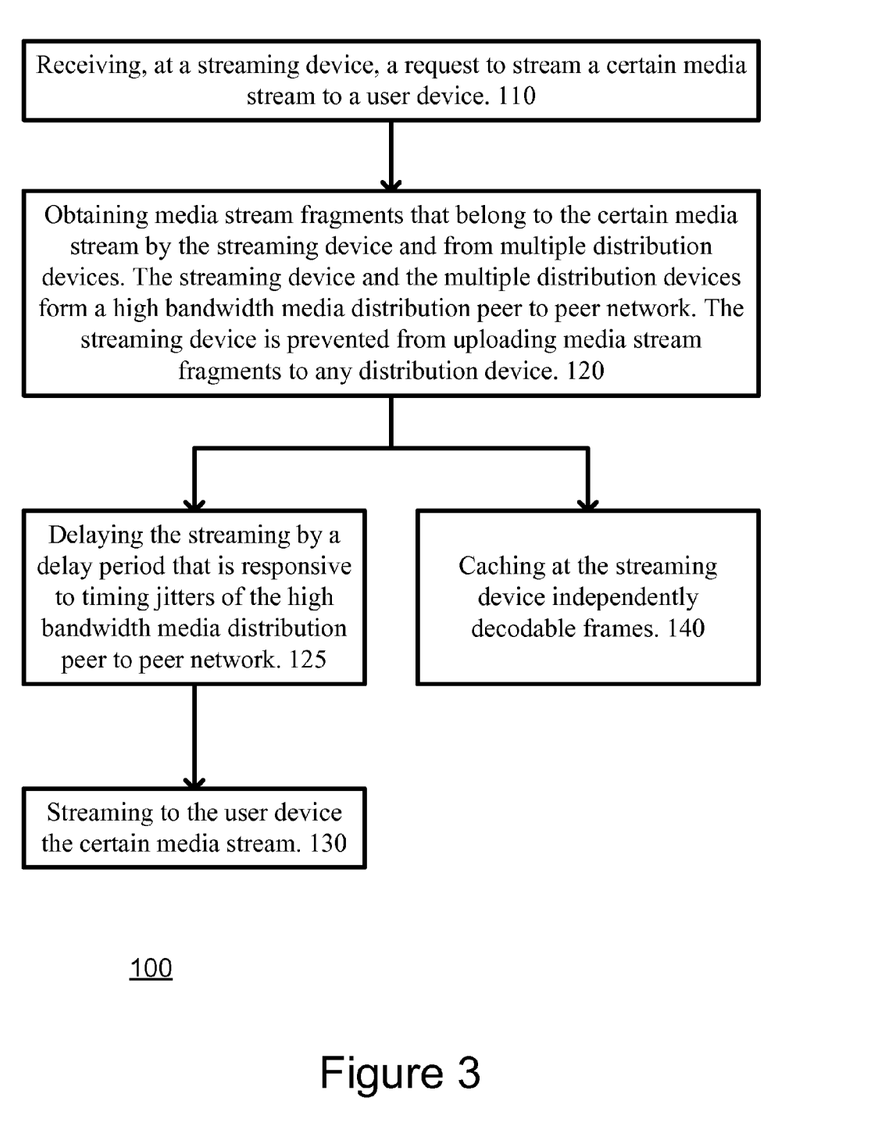
FIG. 3 illustrates a method for providing on demand streaming media to a user device according to an embodiment of the invention.

FIG. 3 illustrates method 100 for providing on demand streaming media to a user device according to an embodiment of the invention.

Method 100 starts by stage 110 of receiving, at a streaming device, a request to stream a certain media stream to a user device. The streaming device is connected to multiple user devices over a network and is adapted to concurrently transmit multiple media streams to the multiple user devices.

Stage 110 is followed by stage 120 of obtaining media stream fragments that belong to the certain media stream by the streaming device and from multiple distribution devices.

The streaming device and the multiple distribution devices form a high bandwidth media distribution peer to peer network. The streaming device is prevented from uploading media stream fragments to any distribution device.

Stage 120 is followed by stages 130 and 140.

Stage 130 includes streaming to the user device the certain media stream. It is noted that stage 130 can be preceded by stage 125 of delaying the streaming by a delay period that is responsive to timing jitters of the high bandwidth media distribution peer to peer network.

Conveniently, stage 120 involves applying peer to peer file sharing techniques. This stage scan include at least some of the following or a combination thereof: (i) sending transfer requests to obtain the media stream fragments from the multiple distribution devices; wherein a priority of a transfer request is responsive to a state of a buffer allocated for buffering the media stream fragments; (ii) sending transfer requests to obtain the media stream fragments from the multiple distribution devices; wherein a priority of a transfer request is responsive to streaming discontinuities of the certain media stream; (iii) determining which media stream fragment group (which media content representation portion) to obtain; wherein the media stream fragment groups are grouped in response to at least one characteristic of the certain media stream; (iv) reconstructing media stream fragments using forward error correction schemes; and (v) maintaining a session pool between the streaming device and each distribution device that sends media stream fragments to the streaming device.

Stage 140 includes caching at the streaming device independently decodable frames. These frames can be extracted from media stream fragments that were obtained by the streaming device. Additionally or alternatively, these frames can be obtained by the streaming device based upon a popularity of media streams to which the media stream fragments belong. Stage 140 can include caching popular content prefixes. Additionally or alternatively, stage 140 can include caching independently decodable frames that belong to a media stream that was requested by the user.

It is noted that the user request (received during stage 110) can be a request to perform a fast forward operation or a fast rewind operation related to the certain media stream. In this case stage 120 includes obtaining fragments of a certain modified media stream that comprises independently decodable frames of the certain media stream. Stage 130 includes streaming to the user device the certain modified media stream.

Figure 4:
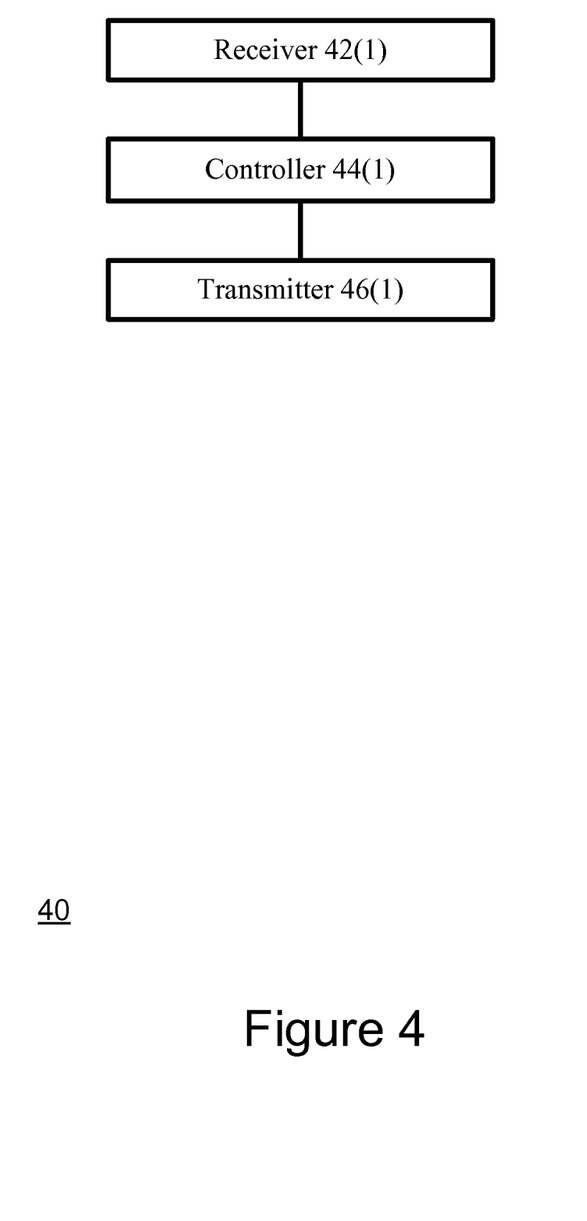
FIG. 4 illustrates a distribution device according to an embodiment of the invention.

FIG. 4 illustrates distribution device 40(1) according to an embodiment of the invention.

Distribution device 40(1) can be a server, but this is not necessarily so. It includes receiver 42(1), controller 44(1) and transmitter 46(1). It is noted the prior art processors, I/O interfaces, busses, bridges, memory units, software, firmware and/or middleware can be utilized to provide these mentioned above functionalities.

Receiver 42 (or another components that differs from receiver 42 but receives control signals) is adapted to receive at least some of the following: (i) high priority transfer requests to provide a first group of media stream fragments to streaming device 30, (ii) medium priority transfer requests to provide a second group of media stream fragments to streaming device 30, and (iii) low priority transfer requests to receive a fourth group of media stream fragments. It is noted that the low priority transfer requests can include low priority "local" transfer requests and, additionally or alternatively, low priority "disseminating" transfer requests.

Controller 44(1) can perform at least one of the following operations or a combination thereof: (i) control the operation of distribution device 40(1), (ii) select which transfer requests to fulfill in response to a priority to each transfer request; (iii) initiate a transmission of low priority transfer requests to receive a fourth group of media stream fragments (which can be low priority "local" transfer requests and, additionally or alternatively, low priority "disseminating" transfer requests), and the like.

Transmitter 46(1) is adapted to transmit obtained media stream fragments of fulfilled transfer requests to streaming device 30, and additionally or alternatively to other distribution devices. It is also adapted to transmit low priority transfer requests to receive the fourth group of media stream fragments.

It is noted that distribution device 40(1) is also adapted to send any additional information required for peer to peer sharing of media stream fragments.

Conveniently, media stream fragments are provided to high bandwidth media distribution peer to peer networks 10, 12 and 14 via a content provider. The content provider can be connected to media processing device 60 (of FIG. 1) that determines where to send newly received media stream fragments. Media processing device 60 can send media stream fragments to selected distribution devices per each high bandwidth media distribution peer to peer network. It is noted that instead of a centralized approach (using device 60) a distributed approach can be implemented, or a combination thereof. A distributed approach includes ingesting new content is ingested to a certain distribution device; advertising the new content across one or more high bandwidth peer to peer networks (for example—by using some middleware), and then receiving low priority "dissemination" transfer requests from one or more other distribution devices that distribute the new content.

According to an embodiment of the invention media processing device 60 partitions each media content representation to media content representation portions. Thus, the tracker and peers of each high bandwidth media distribution peer to peer network will relate to the media content representation portions and not to the media content representation as a whole. Thus, if the user requests to view a certain movie from a certain point of time the high bandwidth media distribution peer to peer network will try to obtain media stream fragments that belong to the relevant media content representation portion (the portion that include media stream fragments of about the certain point in time) instead of trying to obtain the while media content representation. It is noted that other media content representation portions can be obtain by applying the so called low priority "local" transfer requests and "dissemination" low priority transfer requests.

According to an embodiment of the invention media processing device can generate one or more media content representations of received media content. It can, additionally or alternatively, apply media processing operations, compress media content, encrypt media content, decrypt media content, and the like.

Figure 5:
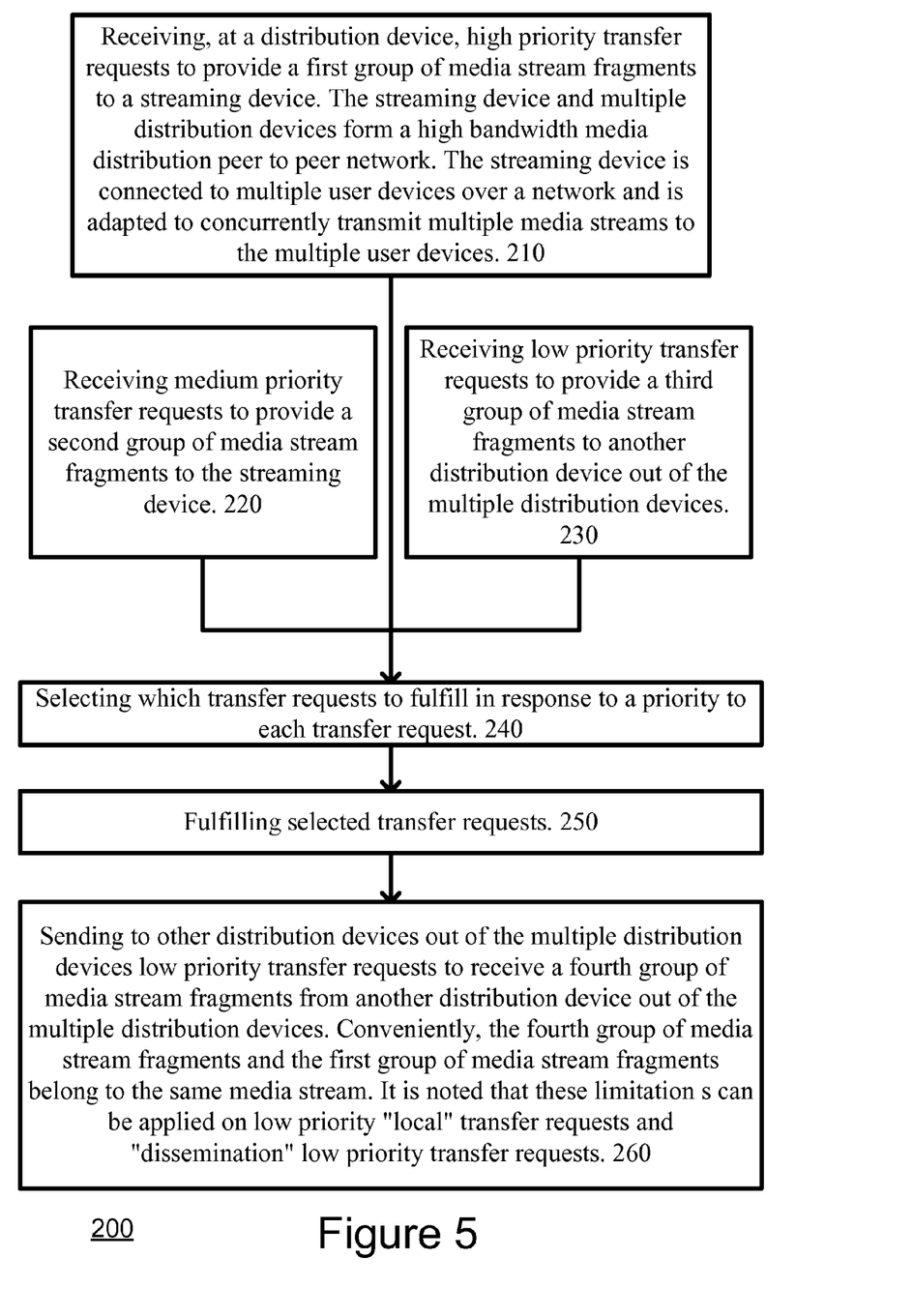
FIG. 5 illustrates a method for providing media stream portions to a user device, according to an embodiment of the invention.

FIG. 5 illustrates method 200 for providing media stream portions to a user device, according to an embodiment of the invention.

Method 200 starts by stages 210, 220 and 230. These stages include receiving transfer requests. It is noted that at a given point in time not all types of transfer requests are received.

Stage 210 includes receiving, at a distribution device, high priority transfer requests to provide a first group of media stream fragments to a streaming device. The streaming device and multiple distribution devices form a high bandwidth media distribution peer to peer network. The streaming device is connected to multiple user devices over a network and is adapted to concurrently transmit multiple media streams to the multiple user devices;

Stage 220 includes receiving medium priority transfer requests to provide a second group of media stream fragments to the streaming device.

Stage 230 includes receiving low priority transfer requests to provide a third group of media stream fragments to another distribution device out of the multiple distribution devices.

Each stage out of stages 210, 220 and 230 is followed by stage 240 of selecting which transfer requests to fulfill in response to a priority to each transfer request.

Stage 240 is followed by stage 250 of fulfilling selected transfer requests.

Stage 240 can be responsive to various factors, such as but not limited to a medium priority transfer request limitation and, additionally or alternatively, to a low priority transfer request limitation. It is noted that limitation s can be applied on low priority "local" transfer requests and "dissemination" low priority transfer requests.

Method 200 further includes stage 260 of sending to other distribution devices out of the multiple distribution devices low priority transfer requests to receive a fourth group of media stream fragments from another distribution device out of the multiple distribution devices. Conveniently, the fourth group of media stream fragments and the first group of media stream fragments belong to the same media stream. It is noted that these limitation s can be applied on low priority "local" transfer requests and "dissemination" low priority transfer requests.

Figure 6:
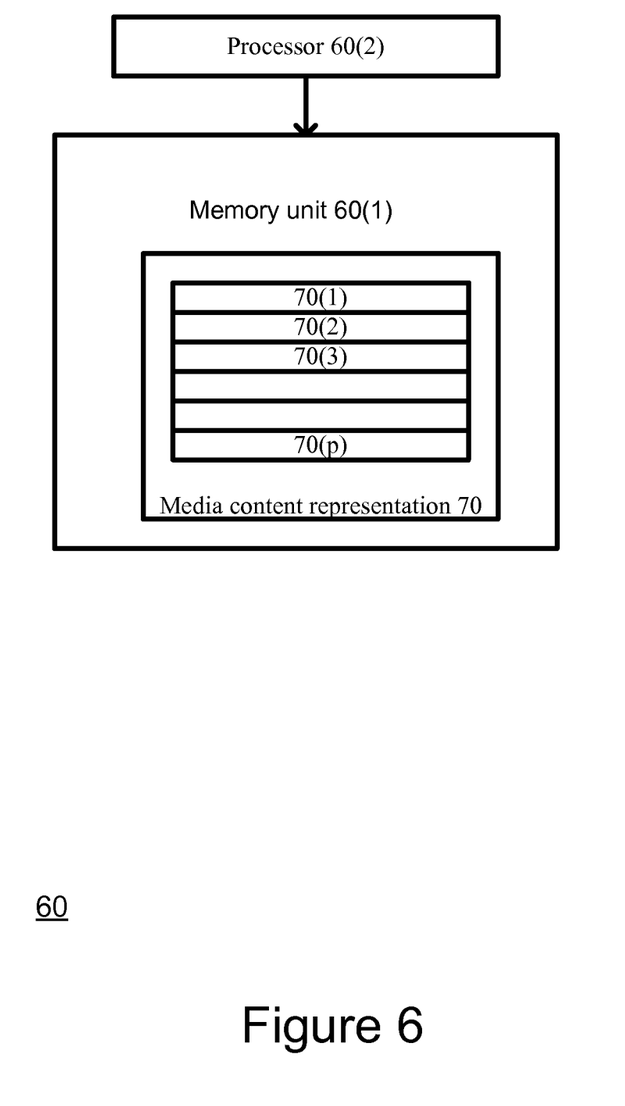
FIG. 6 illustrates a media processing device according to an embodiment of the invention.

FIG. 6 illustrates media processing device 60 according to an embodiment of the invention.

Media processing device 60 includes memory unit 60(1) for storing a media content representations and processor 60(2). Processor 60(2) is adapted to partition media content representation 70 to multiple portions 70(1)-70($p$) in response to at least one characteristic of the media content representation. Processor 60(2) is also adapted to participate (at least initiate) in a distribution of media content representation portions 70(1)-70($p$) between multiple distribution devices such as 40(1)-40($n$).

It is noted that according to another embodiment of the invention a partition of a media content representation to media content representation portions can be performed by a distribution device. Processor 60(2) can partition a media content representation in response to one or more characteristics of the media content representation. The partitioning can include separating structural elements of the media content representation s from each other (for example separating between metadata tables such as PAT and PMT and elementary streams), aligning media content representation portions with the end of group of pictures, with the end of frames. If, for example, a media content representation is represented by multiple layers (differential or non-differential layers) then these layers should be separated from each other (included in different media content representation portions). Various layer based representations of media streams are illustrated in U.S. Pat. No. 7,116,716 of Eshet et al and in U.S. Pat. No. 5,847,760 of Elmaliah.

Figure 7:
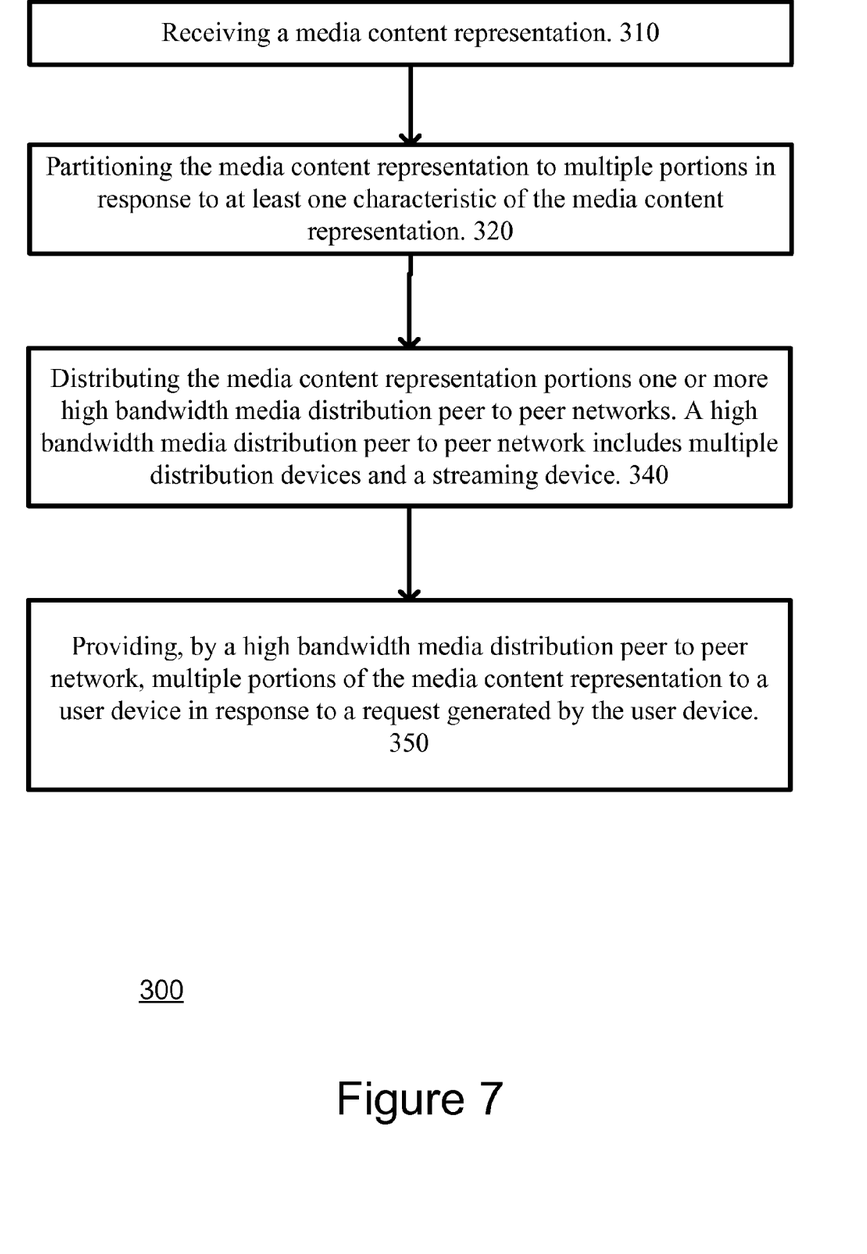
FIG. 7 illustrates a method for providing media stream portions to a user device, according to an embodiment of the invention.

FIG. 7 illustrates method 300 for providing media stream portions to a user device, according to an embodiment of the invention.

Method 300 starts by stage 310 of receiving a media content representation. The media content representation can be received, for example, by media content representation processing device 60.

Stage 310 is followed by stage 320 of partitioning the media content representation to multiple portions in response to at least one characteristic of the media content representation. The partitioning can be executed, for example, by processor 60(2), in response to one or more characteristic of the media content representation, as illustrated above.

Stage 320 is followed by stage 340 of distributing the media content representation portions one or more high bandwidth media distribution peer to peer networks. A high bandwidth media distribution peer to peer network includes multiple distribution devices and a streaming device.

Stage 340 is followed by providing, by a high bandwidth media distribution peer to peer network, multiple portions of the media content representation to a user device in response to a request generated by the user device.

Conveniently, a computer readable medium having computer-readable code embodied therein for providing media stream fragments, the computer-readable code includes instructions for executing one or more stage of method 100, 200, and 300.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing on demand streaming media to a user device, the method comprises:
   receiving, at a streaming device, a request to stream a certain media stream to a user device; wherein the streaming device is coupled to multiple user devices over a network and is adapted to concurrently transmit multiple media streams to the multiple user devices;
   establishing, by the streaming device, a peer to peer session with each distribution device out of multiple distribution devices that holds media stream fragments that belong to the certain media stream; wherein the streaming device and the multiple distribution devices form a high bandwidth media distribution peer to peer network, and the distribution devices do not directly interact with the user devices and each individually stores less than three minutes of media stream fragments per media stream, and the streaming device does not include any complete content for distribution;
   generating by a distribution device a low priority local transfer request; wherein the low priority local transfer request requests to obtain media stream fragments that differ from media stream fragments requested by the streaming device from the distribution device but belong to a same media stream as media stream fragments requested by the streaming device;
   choking or fulfilling, by another distribution device of the multiple distribution devices, the low priority local transfer request;
   obtaining the media stream fragments by the streaming device and from multiple distribution devices; wherein the streaming device is prevented from uploading media stream fragments to any distribution device; and
   streaming to the user device the certain media stream.

2. The method according to claim 1 wherein the obtaining comprises sending transfer requests to obtain the media stream fragments from the multiple distribution devices; wherein a priority of a transfer request is responsive to a state of a buffer allocated for buffering the media stream fragments; wherein the sending of the transfer requests comprises sending of high priority transfer requests, so as to obtain a first group of media stream fragments that corresponds to a first point in time, indicated in the request to stream the certain media stream, till a second point in time.

3. The method according to claim 1 wherein the obtaining comprises sending transfer requests to obtain the media stream fragments from the multiple distribution devices; wherein a priority of a transfer request is responsive to streaming discontinuities of the certain media stream.

4. The method according to claim 1 comprising:
receiving a request to perform a fast forward operation or a fast rewind operation related to the certain media stream;
obtaining fragments of a certain modified media stream that comprises independently decodable frames of the certain media stream; and
streaming to the user device the certain modified media stream.

5. The method according to claim 1 comprising caching at the streaming device independently decodable frames extracted from media stream fragments that were obtained by the streaming device.

6. The method according to claim 1 comprising caching at the streaming device media stream fragments obtained by the streaming device based upon a popularity of media streams to which the media stream fragments belong.

7. The method according to claim 1 comprising maintaining a session pool between the streaming device and each distribution device that sends media stream fragments to the streaming device.

8. The method according to claim 1 comprising generating by the distribution device a low priority disseminating transfer request; wherein the low priority disseminating transfer request requests disseminating media stream fragments requested by the streaming device between peers of the high bandwidth media distribution peer to peer network; and choking or fulfilling, by another distribution device of the multiple distribution devices, the low priority transfer request.

9. The method according to claim 8, comprising governing a magnitude of dissimilation of a media stream fragment based on a metadata associated with the media stream fragment.

10. The method according to claim 1 wherein media stream fragments of a certain media stream are arranged in media stream fragment groups; wherein the receiving is followed by determining which media stream fragment group to obtain; wherein the media stream fragment groups are grouped in response to at least one characteristic of the certain media stream.

11. A non-transitory computer readable medium having computer-readable code embodied therein for providing on demand streaming media to a user device, the computer-readable code comprising instructions for:
receiving, at a streaming device, a request to stream a certain media stream to a user device; wherein the streaming device is coupled to multiple user devices over a network and is adapted to concurrently transmit multiple media streams to the multiple user devices;
establishing, by the streaming device, a peer to peer session with each distribution device out of multiple distribution devices that holds media stream fragments that belong to the certain media stream; wherein the streaming device and the multiple distribution devices form a high bandwidth media distribution peer to peer network, and the distribution devices do not directly interact with the user devices and each individually stores less than three minutes of media stream fragments per media stream, and the streaming device does not include any complete content for distribution;
generating by a distribution device a low priority local transfer request; wherein the low priority local transfer request requests to obtain media stream fragments that differ from media stream fragments requested by the streaming device from the distribution device but belong to a same media stream as the media stream fragments requested by the streaming device;
choking or fulfilling, by another distribution device of the multiple distribution devices, the low priority local transfer request;
obtaining the media stream fragments by the streaming device and from multiple distribution devices; wherein the streaming device is prevented from uploading media stream fragments to any distribution device; and
streaming to the user device the certain media stream.

12. The non-transitory computer readable medium of claim 11, wherein the computer-readable code comprises instructions for sending transfer requests to obtain the media stream fragments from the multiple distribution devices; wherein a priority of a transfer request is responsive to a state of a buffer allocated for buffering the media stream fragments.

13. The non-transitory computer readable medium of claim 11, wherein the computer-readable code comprises instructions for sending transfer requests to obtain the media stream fragments from the multiple distribution devices; wherein a priority of a transfer request is responsive to streaming discontinuities of the certain media as a result of network problems.

14. The non-transitory computer readable medium of claim 11, wherein the computer-readable code comprises instructions for sending transfer requests to obtain the media stream fragments from the multiple distribution devices; wherein a priority of a transfer request is responsive to streaming discontinuities of the certain media stream as a result of a user request to view the certain media stream in a non-sequential manner.

15. The non-transitory computer readable medium of claim 11, wherein the computer-readable code comprises instructions for:
receiving a request to perform a fast forward operation or a fast rewind operation related to the certain media stream;
obtaining fragments of a certain modified media stream that comprises independently decodable frames of the certain media stream; and
streaming to the user device the certain modified media stream.

16. The non-transitory computer readable medium of claim 11, wherein the computer-readable code comprises instructions for caching at the streaming device media stream fragments obtained by the streaming device based upon a popularity of media streams to which the media stream fragments belong.

17. The non-transitory computer readable medium of claim 11, wherein the computer-readable code comprises instructions for caching at the streaming device media stream fragments obtained by the streaming device based upon a popularity of media streams to which the media stream fragments belong.

18. The non-transitory computer readable medium of claim 11 wherein media stream fragments of a certain media stream are arranged in media stream fragment groups; wherein the computer-readable code comprises instructions for determining which media stream fragment group to obtain; wherein the media stream fragment groups are grouped in response to at least one characteristic of the certain media stream.

19. A system comprising a streaming device and multiple distribution devices having one or more processors executing instructions stored on one or more memories to perform one or more functionalities, the streaming device performing the functionalities including:

a receiver, adapted to receive a request to stream a certain media stream to a user device and to receive media stream fragments of the certain media stream; wherein the media stream fragments are obtained from multiple distribution devices; wherein the streaming device is configured to establish a peer to peer session with each distribution device that holds media stream fragments that belong to the certain media stream; wherein the streaming device and the multiple distribution devices form a high bandwidth media distribution peer to peer network; wherein the distribution devices do not directly interact with the user devices and each individually stores less than three minutes of media stream fragments per media stream; wherein the streaming device does not include any complete content for distribution; wherein the streaming device is coupled to multiple user devices over a network; wherein the streaming device is prevented from uploading media stream fragments to any distribution device;

multiple buffers, wherein a certain buffer is adapted to buffer media stream fragments of the certain media stream; and     a transmitter, coupled to the multiple buffers, wherein the transmitter is adapted to concurrently transmit multiple media streams to the multiple user devices; wherein the multiple media stream comprises the certain media stream;

wherein a distribution device of the multiple distribution devices is arranged to generate a low priority local transfer request;

wherein another distribution device of the multiple distribution devices is arranged to choke or fulfill the low priority local transfer request;

wherein the low priority local transfer request requests to obtain media stream fragments that differ from media stream fragments requested by the streaming device from the distribution device but belong to a same media stream as the media stream fragments requested by the streaming device.

20. The system according to claim 19 wherein the receiver is adapted to send transfer requests to obtain the media stream fragments from the multiple distribution devices; wherein a priority of a transfer request is responsive to a state of a buffer allocated for buffering the media stream fragments.

21. The system according to claim 19 wherein the receiver is adapted to send transfer requests to obtain the media stream fragments from the multiple distribution devices; wherein a priority of a transfer request is responsive to streaming discontinuities of the certain media stream.

22. The system according to claim 19 wherein the receiver is adapted to receive a request to perform a fast forward operation or a fast rewind operation related to the certain media stream; the receiver obtains fragments of a certain modified media stream that comprises independently decodable frames of the certain media stream; and the transmitter streams to the user device the certain modified media stream.

23. The system according to claim 19 wherein a buffer caches independently decodable frames extracted from media stream fragments that were obtained by the streaming device.

24. The system according to claim 19 wherein a buffer caches independently decodable frames obtained by the streaming device based upon a popularity of media streams to which the media stream fragments belong.

25. The system according to claim 19 wherein media stream fragments of a certain media stream are arranged in media stream fragment groups; and wherein the streaming device determines which media stream fragment group to obtain; wherein the media stream fragment groups are grouped in response to at least one characteristic of the certain media stream.

26. The method according to claim 1, comprises receiving from a tracker a list of active distribution devices, wherein the list comprises at least one distribution device that belongs to the high bandwidth media distribution peer to peer network that includes the streaming device and wherein the tracker is coupled to the high bandwidth media distribution peer to peer network.

27. The system according to claim 19, wherein the distribution device is arranged to generate a low priority disseminating transfer request; wherein the low priority disseminating transfer request requests disseminating media stream fragments requested by the streaming device between peers of the high bandwidth media distribution peer to peer network; and choking or fulfilling, by another distribution device of the multiple distribution devices, the low priority transfer request.

28. The method according to claim 1, comprising sending, by a streaming device a high priority transfer request to obtain certain media stream fragments that belongs to the certain media stream; wherein the high priority transfer request is send to multiple concurrent distribution devices; wherein the high priority transfer request is fulfilled by at least two of the multiple concurrent distribution devices that obtained the high priority transfer request.

29. The method according to claim 1, comprising assigning a high priority to a transfer request to obtain certain media stream fragments if a buffer of a certain streaming device that was expected to receive the certain media stream fragments has depleted.

\* \* \* \* \*